(12) United States Patent
Miseldine

(10) Patent No.: US 12,175,263 B2
(45) Date of Patent: *Dec. 24, 2024

(54) UNIFIED SEMANTIC MODEL OF USER INTENTIONS

(71) Applicant: SAP SE, Walldorf (DE)

(72) Inventor: Philip Miseldine, Bruchsal (DE)

(73) Assignee: SAP SE, Walldorf (DE)

( * ) Notice: Subject to any disclaimer, the term of this patent is extended or adjusted under 35 U.S.C. 154(b) by 0 days.

This patent is subject to a terminal disclaimer.

(21) Appl. No.: 18/462,953

(22) Filed: Sep. 7, 2023

(65) Prior Publication Data

US 2023/0418625 A1 Dec. 28, 2023

Related U.S. Application Data

(63) Continuation of application No. 17/100,472, filed on Nov. 20, 2020, now Pat. No. 11,775,318.

(51) Int. Cl.
  *G06F 11/34* (2006.01)
  *G06F 3/01* (2006.01)
  *G06F 9/445* (2018.01)
  *G06N 20/00* (2019.01)

(52) U.S. Cl.
  CPC ............ *G06F 9/4451* (2013.01); *G06F 3/011* (2013.01); *G06F 11/3438* (2013.01); *G06N 20/00* (2019.01)

(58) Field of Classification Search
  CPC ...................................................... G06F 9/445
  See application file for complete search history.

(56) References Cited

U.S. PATENT DOCUMENTS

| | | |
|---|---|---|
| 9,760,767 B1 | 9/2017 | Bonazzoli et al. |
| 10,387,787 B1 | 8/2019 | Cessna et al. |
| 10,853,396 B2 | 12/2020 | Miseldine et al. |
| 10,949,432 B1 | 3/2021 | Grayson |
| 11,036,523 B2 * | 6/2021 | Almecija ................. G06F 9/451 |
| 2013/0132851 A1 * | 5/2013 | Konopniki ........... G06F 16/9535 |
| | | 715/736 |

(Continued)

OTHER PUBLICATIONS

Non-Final Office Action in U.S. Appl. No. 17/100,472, dated Sep. 14, 2022, 28 pages.

(Continued)

*Primary Examiner* — Di Xiao

(74) *Attorney, Agent, or Firm* — Fish & Richardson P.C.

(57) ABSTRACT

The present disclosure involves systems, software, and computer implemented methods for generating a unified semantic model identifying a user's intentions or goals within operating the system. By determining the intent and desires of the user, tasks and queries associated with or requested by the user can be more effectively optimized, automated, or otherwise improved. In some computing environments, multiple users access a database which includes a collection of software objects. The objects within the database can sometimes form a hierarchy, with a parent-child relationship among them. Traditionally, a developer creating the database and the objects within can only determine a user's intent based on the actions taken by the user within the database. The present solution provides the developer with a higher level model representing different users' intents based on observed data from a number of sources in addition to the user's interaction with the database.

20 Claims, 3 Drawing Sheets

(56) References Cited

U.S. PATENT DOCUMENTS

| | | |
|---|---|---|
| 2014/0095150 A1 | 4/2014 | Berjikly et al. |
| 2016/0092502 A1 | 3/2016 | Krishnamurthy et al. |
| 2017/0052766 A1 | 2/2017 | Garipov |
| 2017/0069340 A1 | 3/2017 | Nowson et al. |
| 2017/0341513 A1 | 11/2017 | Wu et al. |
| 2019/0279231 A1 | 9/2019 | Ning et al. |
| 2022/0164194 A1 | 5/2022 | Miseldine |

OTHER PUBLICATIONS

Final Office Action in U.S. Appl. No. 17/100,472, dated Mar. 7, 2023, 27 pages.

* cited by examiner

UNIFIED SEMANTIC MODEL OF USER INTENTIONS

CLAIM OF PRIORITY

This application claims priority to and under 35 USC § 120 to U.S. patent application Ser. No. 17/100,472, filed on Nov. 20, 2020 the entire contents of which are hereby incorporated by reference.

TECHNICAL FIELD

This disclosure generally relates to computer-implemented methods, software, and systems for determining user intent in a computing environment, and assigning importance to software objects based on user intent.

BACKGROUND

Enterprise software can involve users operating or interacting with numerous database objects stored in a backend system. While a user may need to interact with many objects, not all the objects that the user interacts with are of equal importance to the user.

SUMMARY

In general, this disclosure involves systems, software, and computer implemented methods for generating, modifying and utilizing unified semantic models representing user intent. One example implementation includes generating a generic semantic model representing user behavior. The generic semantic model can include a plurality of nodes an edges, each node representing a user characteristic and including an importance value, and each edge defining a relationship between two nodes. Observing behavior of a user operating a computing device and modifying, based on the observed behavior of the user operating the computing device, one or more importance values associated with one or more nodes of the generic semantic model in order to create a user-specific semantic model representing the user. Generating, based on the observed behavior of the user operating the computing device, one or more importance objects, the one or more importance objects are each associated with one or more target software objects stored in an object database, and storing the user-specific semantic model and the one or more associated importance objects in a semantic model database. Determining, in response to a query of a particular target software object and based on the user-specific semantic model, an object importance associated with the user and the target object.

Implementations can optionally include one or more of the following features.

In some instances, observing behavior of the user includes recording one or more observed parameters associated with the user's operation of the computing device. The parameters can include key strokes, key stroke rate, mouse clicks or screen taps, and software executing on the computing device. Observed parameters can include environmental parameters, such as ambient noise, ambient light, physical location, or connection type. Observed parameters can further include user behavioral responses identified during operation of the computer device, including at least one of a user heartrate, a user gaze location, user facial expressions, neuro-activity received from a brain computer interface, or user body position and movement.

In some instances, a user emotional state can be determined based on the observed parameters and can include a stress rating, an attention rating, and a happiness rating.

In some instances, the one or more target software objects form a hierarchy of target objects, and the importance object associated with a parent target software object is associated with one or more child target software objects.

In some instances, the generic semantic model is generated based on an identified role of the user.

In some instances, modifying the one or more importance values includes inputting information associated with the observed behavior to a machine learning model, which determines one or more modified importance values.

Similar operations and processes may be performed in a different system comprising at least one processor and a memory communicatively coupled to the at least one processor where the memory stores instructions that when executed cause the at least one processor to perform the operations. Further, a non-transitory computer-readable medium storing instructions which, when executed, cause at least one processor to perform the operations may also be contemplated. Additionally, similar operations can be associated with or provided as computer-implemented software embodied on tangible, non-transitory media that processes and transforms the respective data, some or all of the aspects may be computer-implemented methods or further included in respective systems or other devices for performing this described functionality. The details of these and other aspects and embodiments of the present disclosure are set forth in the accompanying drawings and the description below. Other features, objects, and advantages of the disclosure will be apparent from the description, drawings, and the claims.

DETAILED DESCRIPTION

Figure 1:
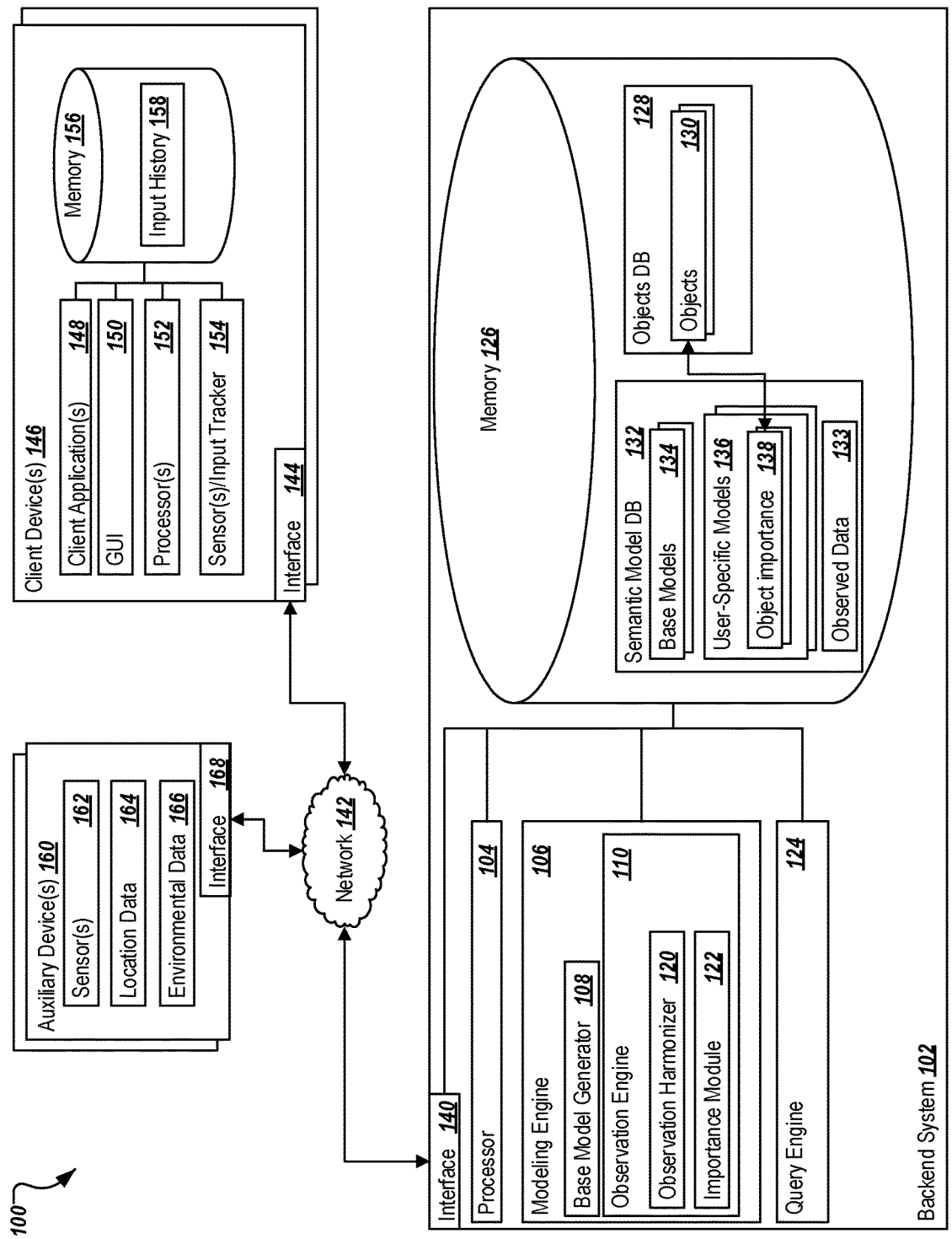
FIG. 1 depicts an overview diagram of a system for generating, modifying and utilizing unified semantic models representing user intent.

This disclosure describes a solution for generating a unified semantic model identifying a user's intentions or goals while operating, or interacting with, the system. By determining the intent and desires of the user, tasks and queries associated with or requested by the user can be more effectively optimized, automated, or otherwise improved. In some computing environments, multiple users access a database which includes a collection of software objects. For example, tables, client accounts, user interface elements, reports, customer records, or other information can reside in database software objects with which the user (and others of the multiple users) needs to interact. The objects within the database can, in some instances, form a hierarchy with a parent-child relationship among at least some of those objects. For example, a parent object may be an accounts payable table which contains an amount and name associated with each creditor that is owed money. A child object in this example can be a table containing details (e.g., account info, agreement documents, etc.) for a particular creditor of the accounts payable table. Traditionally, a developer creating the database and the objects within can only determine a user's intent based on the explicit actions taken by the user within the database. The present solution provides the developer with a higher level model representing different users' intents based on observed data from a number of sources in addition to the user's interaction with the database.

In some implementations, a generic semantic model serves as a starting point, with a user-specific model being generated based on the generic semantic model. The generic semantic model can include multiple nodes, with relationships between the nodes defined as edges. Each node can represent a particular intent or state associated with the user. For example, there can be a node for stress and a node for attention level, which can be associated with one or more actions the user is currently or has recently taken. Additionally, the edges can define the type of relationship between different nodes. For example, the current attention level of a user can be associated with an importance based on the current tasks executing on the computing device, where the current attention level can be used to determine a priority level for the current tasks. The generic semantic model can be based on user type or role (e.g., manager, developer, or specialist, etc.), as well other known initial parameters associated with the user (e.g., sex, age, experience, the device being used, etc.). The user can then be observed, over time, interacting with the database and its objects. Observations can include inputs to the system, such as keyboard strokes, screen touches, and mouse inputs, among others, as well as additional data about the user such as eye tracking data (gaze position on a screen), heartrate, facial expression, posture, and additional open applications or background applications, among others. Additionally, environmental parameters can be monitored such as ambient light, noise, location, temperature etc. These observations can be harmonized and correlated with each other to determine both a state of the user and the user's intent. For example, if the user has a role "software developer" and is currently typing rapidly in a dark room while listening to music, it may be determined that the user is currently coding new software, and unrelated or non-urgent notifications could be suppressed. Additionally, in this example, if the user submits a query to the database, the response can be automatically sorted based on a relevance each object has to coding new software, or otherwise filtered for relevant information and data sets.

Over time observations of the user can be utilized to generate a user-specific semantic model, in which the edges and nodes have been assigned weights specific to the user based on the observations. In some implementations, this is done using a neural network or other suitable machine learning algorithm or technique. The user-specific semantic model can be associated with an account of the user, and can be stored in a semantic model database which contains both generic semantic models and user-specific models for a multitude of users. The models can include an object importance parameters which each indicate a relative importance for an associated object or group of objects stored in the database.

With a database of stored user-specific semantic models, the database developer creating or modifying the database can determine in greater detail the needs and intent of the users of the database. Queries can be run against objects in the database, and their importance to specific users or groups of users can be determined. In this manner, the developer can determine which objects or groups of objects are important to which users or groups of users. Further, greater automation can be implemented, as each action the user takes when interacting with the database can be interpreted based on an enhanced understanding of the user's intent based on the user's user-specific semantic model.

Turning to the illustrated example implementation, FIG. 1 is a block diagram illustrating an example system 100 for generating, modifying and utilizing unified semantic models representing user intent. In general, the system 100 allows the illustrated components to share and communicate information across devices and systems (e.g., backend system 102, client devices 146, auxiliary devices 160, and others), via network 142. As described herein, the backend system 102 can be a cloud-based component or system (partially or fully), while in other instances, non-cloud systems can be used. In some instances, non-cloud-based systems, such as on-premise systems, client-server applications, and applications running on one or more client devices, as well as combinations thereof, can use or adapt the processes described herein. Although components are shown individually, in some implementations, functionality of two or more components, systems, or servers can be provided by a single component, system, or server.

As used in the present disclosure, the term "computer" is intended to encompass any suitable processing device. For example, backend system 102 and client devices 146 can be any computer or processing device such as, for example, a blade server, general-purpose personal computer (PC), Mac® workstation, UNIX-based workstation, or any other suitable device. Moreover, although FIG. 1 illustrates a single backend system 102, the backend system 102 can be implemented using a single system or more than those illustrated, as well as computers other than servers, including a server pool. In other words, the present disclosure contemplates computers other than general-purpose computers, as well as computers without conventional operating systems. Similarly, the client devices 146 can be any system that can request data and/or interact with the backend system 102. The client devices 146, in some instances, can be a desktop system, a client terminal, or any other suitable device, including a mobile device, such as a smartphone, tablet, smartwatch, or any other mobile computing device. In general, each illustrated component can be adapted to execute any suitable operating system, including Linux, UNIX, Windows, Mac OS®, Java™, Android™, Windows Phone OS, or iOS™, among others. The client devices 146 can include one or more specific applications executing on the client devices 146, or the client devices 146 can include one or more Web browsers or web applications that can interact with particular applications executing remotely from the client devices 146.

Client devices 146 are computing devices used by one or more users to interact with the backend system 102. In some cases, system 100 describes an enterprise computing environment, where the user consumes database objects (e.g., objects 130). Client devices 146 include a client application 148, a graphical user interface (GUI) 150, one or more processors 152, at least one sensor or input tracker 154, an interface 144, and a memory 156 storing, among other things, an input history 158.

Although illustrated as a single processor 152 in FIG. 1, multiple processors can be used according to particular needs, desires, or particular implementations of the system 100. Each processor 152 can be a central processing unit (CPU), an application specific integrated circuit (ASIC), a field-programmable gate array (FPGA), or another suitable component. Generally, the processor 152 executes instructions and manipulates data to perform the operations of the client device 146. Specifically, the processor 152 executes the algorithms and operations described in the illustrated figures, as well as the various software modules and functionality, including the functionality for sending communications to and receiving transmissions from backend system 102, as well as to other devices and systems. Each processor 152 can have a single or multiple core, with each core available to host and execute an individual processing thread. Further, the number of, types of, and particular processors 152 used to execute the operations described herein can be dynamically determined based on a number of requests, interactions, and operations associated with the client device 146.

Regardless of the particular implementation, "software" includes computer-readable instructions, firmware, wired and/or programmed hardware, or any combination thereof on a tangible medium (transitory or non-transitory, as appropriate) operable when executed to perform at least the processes and operations described herein. In fact, each software component can be fully or partially written or described in any appropriate computer language including C, C++, JavaScript, Java™, Visual Basic, assembler, Perl®, any suitable version of 4GL, as well as others.

The client device 146 generally communicates with other devices in system 100 via interface 144. The interface 144 is used by the client devices 146 for communicating with other systems in a distributed environment—including within the system 100—connected to the network 142, e.g., backend system 102, auxiliary devices 160, and other systems communicably coupled to the illustrated backend system 102 and/or network 142. Generally, the interface 144 comprises logic encoded in software and/or hardware in a suitable combination and operable to communicate with the network 142 and other components. More specifically, the interface 144 can comprise software supporting one or more communication protocols associated with communications such that the network 142 and/or interface 144 hardware is operable to communicate physical signals within and outside of the illustrated system 100. Still further, the interface 144 can allow the client device 146 to communicate with the backend system 102 and/or other portions illustrated within the system 100 to perform the operations described herein.

Memory 156 of the client device 146 can represent a single memory or multiple memories. The memory 156 can include any memory or database module and can take the form of volatile or non-volatile memory including, without limitation, magnetic media, optical media, random access memory (RAM), read-only memory (ROM), removable media, or any other suitable local or remote memory component. The memory 156 can store various objects or data, including application data, user and/or account information, administrative settings, password information, caches, applications, backup data, repositories storing business and/or dynamic information, and any other appropriate information associated with the client device 146, including any parameters, variables, algorithms, instructions, rules, constraints, or references thereto. Additionally, the memory 156 can store any other appropriate data, such as VPN applications, firmware logs and policies, firewall policies, a security or access log, print or other reporting files, as well as others. While illustrated within the client device 146, memory 156 or any portion thereof, including some or all of the particular illustrated components, can be located remote from the client device 146 in some instances, including as a cloud application or repository. In those instances, the data stored in memory 156 can be accessible, for example, via one of the described applications or systems. As illustrated, memory 156 includes a user input history 158, among other things.

GUI 150 of the client device 146 interfaces with at least a portion of the system 100 for any suitable purpose, including generating a visual representation of any particular client application 148 and/or the content associated with any components of the backend system 102. In particular, the GUI 150 can be used to present results of a query, or allow the user to input queries to the backend system 102, as well as to otherwise interact and present information associated with one or more applications. GUI 150 can also be used to view and interact with various web pages, applications, and web services located local or external to the client device 146. Generally, the GUI 150 provides the user with an efficient and user-friendly presentation of data provided by or communicated within the system. The GUI 150 can comprise a plurality of customizable frames or views having interactive fields, pull-down lists, and buttons operated by the user. In general, the GUI 150 is often configurable, supports a combination of tables and graphs (bar, line, pie, status dials, etc.), and is able to build real time portals, application windows, and presentations. Therefore, the GUI 150 contemplates any suitable graphical user interface, such as a combination of a generic web browser, a web-enable application, intelligent engine, and command line interface (CLI) that processes information in the platform and efficiently presents the results to the user visually.

Client applications 148 execute on the client device 146 to allow the user to interact with the backend system 102 or other devices. The client application 148 can be an enterprise application, and provide access to the backend system (e.g., via a web browser), or client application 148 can be executed locally by the client device 146 and can provide the user with access to database object (e.g., objects 130) for consumption. During use, one or more sensors, or input trackers 154 can record user inputs to the client application 148 or the client device 146 in general. For example, the input tracker 154 can record which applications are running on the client device 146, as well as keystrokes, screen touches, mouse position and clicks, and other inputs associated with the user's use of the client device 146. These inputs can be stored in memory 156 as an input history 158. In some implementations, the inputs are aggregated in the input history 158 until they are transmitted to the backend system 102 for processing. For example, the client device 146 can perform at a predetermined interval (e.g., daily) at a time when significant bandwidth is not required by the user (e.g., 2 AM).

Client device 146 communicates with the backend system 102 using interface 144 as previously discussed via network 142. Network 142 facilitates wireless or wireline communications between the components of the system 100 (e.g., between the backend system 102, the client devices 146, etc.), as well as with any other local or remote computers, such as additional mobile devices, clients, servers, or other devices communicably coupled to network 142, including those not illustrated in FIG. 1. In the illustrated environment, the network 142 is depicted as a single network, but can comprise more than one network without departing from the scope of this disclosure, so long as at least a portion of the network 142 can facilitate communications between senders and recipients. In some instances, one or more of the illustrated components (e.g., the modeling engine 106, the environmental data 166, etc.) can be included within or deployed to network 142 or a portion thereof as one or more cloud-based services or operations. The network 142 can be all or a portion of an enterprise or secured network, while in another instance, at least a portion of the network 142 can represent a connection to the Internet. In some instances, a portion of the network 142 can be a virtual private network (VPN). Further, all or a portion of the network 142 can comprise either a wireline or wireless link. Example wireless links can include 802.11a/b/g/n/ac, 802.20, WiMax, LTE, and/or any other appropriate wireless link. In other words, the network 142 encompasses any internal or external network, networks, sub-network, or combination thereof operable to facilitate communications between various computing components inside and outside the illustrated system 100. The network 142 can communicate, for example, Internet Protocol (IP) packets, Frame Relay frames, Asynchronous Transfer Mode (ATM) cells, voice, video, data, and other suitable information between network addresses. The network 142 can also include one or more local area networks (LANs), radio access networks (RANs), metropolitan area networks (MANs), wide area networks (WANs), all or a portion of the Internet, and/or any other communication system or systems at one or more locations.

In addition to the sensor and input tracker 154 of the client devices 146, auxiliary devices 160 can provide observations associated with the behavior and environment of the user. Auxiliary devices 160 can include one or more sensor 162, or generate location information 164, and/or environmental information 166, and can communicate with network 142 via interface 168 which can be similar to, or different from interface 144 as described above.

Auxiliary devices 160 can include sensors 162 which can be, for example, cameras, thermometers, microphones, brain-computer interfaces, eye tracking devices, or other sensors which can be separate from, or connected as peripherals to the client device 146. These sensors 162 can provide additional observations regarding the user's behavior that is distinct from inputs and actions taken directly with the client device 146. In some implementations, the auxiliary devices 160 are Internet-of-Things (IoT) connected devices which record data. For example, the user may have one or more smart light bulbs in their primary workspace. The smart light bulbs can provide data to the backend system 102 regarding the brightness and hue of the light provided in the workspace, which can then combined with data from the client device 146 in order to develop a larger semantic model of the intent and environment of the user. In another example, an auxiliary device 160 can be a smart watch that is worn by the user, which includes a heartrate sensor. The heartrate sensor can detect a change in user heartrate, which can be correlated with user actions on the client device 146 (e.g., a spike in heartrate as the user reads an email can indicate particular importance associated with the sender of the email).

Auxiliary devices 160 can further provide, obtain, and/or measure location data 164, which can indicate a precise or general location associated with the user. The location data 164 can be determined from intercepted signals (e.g., local WiFi or Bluetooth connections available) or dedicated location information, such the output of a GPS receiver or manually inputted location data associated with the auxiliary device 160 (e.g., an address associated with a house where the auxiliary device is a smart doorbell). In addition to location data 164, environmental data 166 can be determined. Environmental data 166 can be data that is associated with the environment the user is operating in external to the client device 146 and can include weather, time, ambient noise or light, motion, or other environmental information.

The observations of the user's behavior and environment are transmitted to the backend system 102. The backend system 102 includes at least one processor 140, which can be similar to, or different from processor 152 as described above. The backend system 102 further includes an interface 144, which can be similar to or different then interface 168 and interface 144 as described above. Additionally, the backend system 102 includes a modeling engine 106, query engine 124, and memory 126. Memory 126 can be similar to or different from memory 156 as described in the foregoing and includes an objects database 128 and a semantic model database 132. In some implementations, the semantic model database 132 and the objects database 128 can be a single database. In some implementations, they are separate database. While illustrated in FIG. 1 as a single memory 126, memory 126 may in fact be multiple separate memories, in a distributed computing environment. Further, semantics model database 132 and objects database 128 can be distributed, and can include multiple separate databases, or copies distributed across multiple backend systems 102.

The modeling engine 106 can generate and modify semantic models representing the user's intent. The modeling engine 106 includes a base model generator 108 and an observation engine 110. The base model generator 108 can generate a generic semantic models or base models 134 which are not user-specific. The base models 134 can be generated based on user role and have initial values predetermined based on generic user criteria. In some implementations, when a new user registers with the backend system 102, they can be assigned a base model 134 which can be selected based on registration information provided by the user, an assigned user role, or other information.

The modeling engine 106 further includes an observation engine 110. The observation engine can access observed data 133 which can have been generated based on data provided by the auxiliary devices 160 or the client devices 146 (e.g., form the input tracker 154). The observation engine 110 can use an observation harmonizer 120 to aggregate the observed data 133 and determine relationships and correlations between different types of observed data. For example, eye-tracking data from a sensor on a client device 146 can indicate that some presented objects in the GUI 150 are of importance to the user if the user's gaze lingers over them or repeatedly returns to them when an emotional state determined from an auxiliary device 160 is determined as stressed. In some implementations, the observation harmonizer 120 can determine an emotional state based on, for example, images received from a camera (e.g., via sensor 154 in the client device 146) in combination with physiological data (e.g., heart-rate or respiratory rate from a fitness tracker, etc.) from auxiliary devices 160.

The observation harmonizer 120 can include a machine learning model. In some implementations, the machine learning model can be a deep learning model that employs multiple layers of models to generate an output for a received input. A deep neural network is a deep machine learning model that includes an output layer and one or more hidden layers that each apply a non-linear transformation to a received input to generate an output. In some cases, the neural network may be a recurrent neural network. A recurrent neural network is a neural network that receives an input sequence and generates an output sequence from the input sequence. In particular, a recurrent neural network uses some or all of the internal state of the network after processing a previous input in the input sequence to generate an output from the current input in the input sequence. In some other implementations, the machine learning model is a convolutional neural network. In some implementations, the machine learning model is an ensemble of models that may include all or a subset of the architectures described above.

In some implementations, the machine learning model can be a feedforward auto-encoder neural network. For example, the machine learning model can be a three-layer auto-encoder neural network. The machine learning model may include an input layer, a hidden layer, and an output layer. In some implementations, the neural network has no recurrent connections between layers. Each layer of the neural network may be fully connected to the next, e.g., there may be no pruning between the layers. The neural network may include an optimizer for training the network and computing updated layer weights, such as, but not limited to, ADAM, Adagrad, Adadelta, RMSprop, Stochastic Gradient Descent (SGD), or SGD with momentum. In some implementations, the neural network may apply a mathematical transformation, e.g., a convolutional transformation or factor analysis to input data prior to feeding the input data to the network. The machine learning model of the observation harmonizer 120 can, at a high level, generate insights associated with the user from many distinct data types.

The importance module 122 can use the insights of the observation harmonizer to modify a generic semantic model assigned to the user and generate a user-specific semantic model 136. In some implementations, the importance module 122 adjusts weights associated with edges and nodes of a generic semantic model or base model 134, in order to generate a user-specific semantic model 136 that has been tailored to a particular user based on the observations. In some implementations, the importance module 122 further adjusts edge types associated with each edge, which can specify a specific type of relationship between two nodes. For example, where a first node represents an observed behavior (e.g., visual attention) and a second node is associated with an importance, the relationship between the two nodes may be represented by a "related" edge, which signifies that the user's visual attention is related to importance associated with a particular object displayed on their screen. The user-semantic models 136 can contain object importance 138 nodes, which indicate a relative importance for their associated objects 130 stored in the object database 128.

A query engine 124 can query the object importance 138 in one or more user-specific models 136 to determine an object importance 138 for a target object in the objects database 128. For example, a developer may be modifying the format for a particular application which presents several objects 130. The developer may want the application to present objects that are of greater importance to near the top and/or center of the display, while objects of lesser importance are presented around the periphery. In another example, where a notification is to be issued, the developer can determine the relative importance of the notification based on the importance of the object 130 the notification originates from. A developer can use the query engine 124 to query a set of user-specific models 136 (e.g., all the models associated with a particular role or title) and determine which objects are of the greatest importance or relevance for that set of users. In some implementations, objects and their relationships with other objects can be queried. For example, a query of an "approval task" object may include that the object is related to a "customer" object and an "order" object. The query may return that this particular customer is important, but approval tasks for the customer are not.

In some implementations, the object importance 138 within the user-specific models 136 can be exposed to applications or other elements executing in the backend system 102. For example, in some implementations, a table that includes objects 130 can be presented via an application to a particular user. The application can automatically arrange objects 130 in the table based on the object importance 138 contained within the user-specific semantic model 136 for the particular user. In some implementations, the application can perform other automated tasks. For example, the application can pre-cache information relating to more important objects that are the result of a search query, anticipating a higher likelihood of user interaction with those objects. In another example, a table can be presented with a dynamic number of columns, where the columns are selected based on the relative importance of the objects 130 presented in the table, or based on the importance of particular properties of an object (e.g., the cost of a Sales Order). In some implementations, a subset of the objects returned in a query (e.g., the most important three or five) can be presented with an extended UI displaying quick actions the user might take associated with those objects. In some implementations, the objects 130 can be filtered based on their object importance 138. For example, only the top 10 most important objects can be presented to the user. Other smart actions and/or events may be triggered for the most important objects for a particular user, whereas such actions could not be taken for each and every object. By intelligently identifying the most important objects, the present solution can initiate value-added activities, events, and interactions without waiting for a user to indicate that a particular object is important.

While portions of the elements illustrated in FIG. 1 are shown as individual modules that implement the various features and functionality through various objects, methods, or other processes, the software can instead include a number of sub-modules, third-party services, components, libraries, and such, as appropriate. Conversely, the features and functionality of various components can be combined into single components as appropriate.

Figure 2:
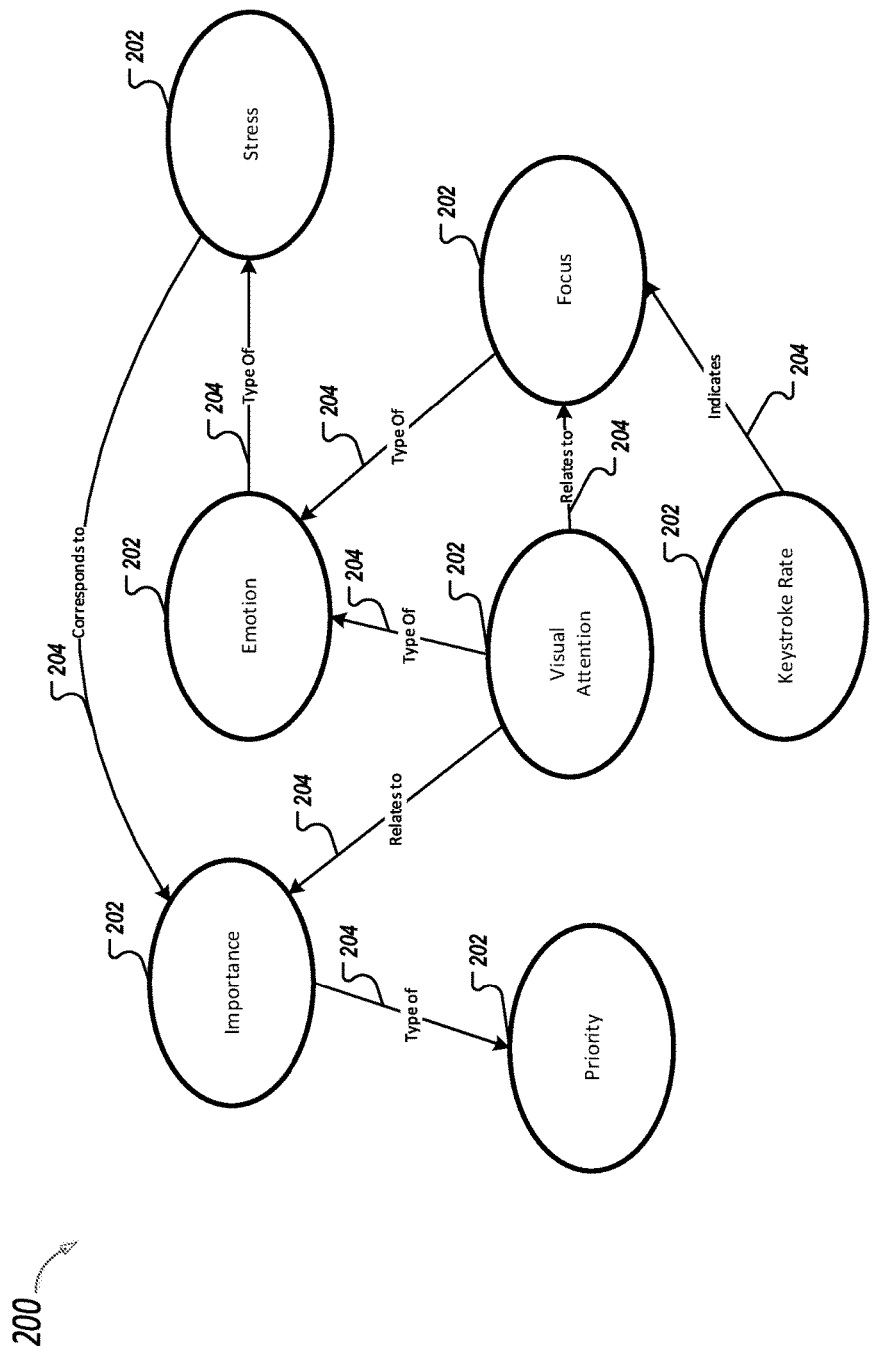
FIG. 2 is an example unified semantic model.

FIG. 2 is an example implementation of a unified semantic model 200. The unified semantic model 200 includes nodes 202 and edges 204. While only a few nodes are presented in the illustrated example for simplicity's sake, the present disclosure contemplates unified semantic models of significantly greater complexity (e.g., thousands of nodes and edges or more).

Each node 202 can represent an element or facet of the user's intent or behavior, or a user characteristic. The nodes 202 can each have an associated weight (e.g., a fraction between 0 and 1, or other value, including values above 1 or negative numbers in some cases). In some implementations, the nodes 202 have a hierarchical structure and can form groups or sets. For example, a node 202 can represent a user's emotional state and be a representation of how emotional the user is currently or has recently reacted. The emotional state node can have several daughter nodes representing different specific emotions (e.g., stress, elation, anger, etc.). These nodes 202 can form a group of nodes representing the user's emotional response, and can provide context to other nodes in the unified semantic model 200. Nodes 202 can represent, but are not limited to, user behavior (e.g., keystrokes, mouse clicks, and screen touches, etc.) and the ambient or environmental condition in which the user is operating (e.g., are the lights off, ambient noise level, etc.). Nodes 202 can additionally contain information or metadata. For example, a priority node can indicate, for a multitude of target objects in an object database (e.g., objects database 128 of FIG. 1) a relative priority or a priority rating. For example, the priority node might indicate a priority of 0.9, or high priority, for target objects related to the corporation "ACME" while simultaneously indicating a priority of 0.3, or low priority, for target objects related to the corporation "ABC." Additionally, each node 202 can contain timing information, where the timing information indicates how recently the node has been modified or refreshed. For example, a node 202 may have a "stale" indication if no new related observations have been made in the past week. A "stale" node 202 may be weighted less compared to other nodes 202 in the unified semantic model 200.

Context can be provided by relationships between nodes, represented by edges 204. The edges 204 can each have an associated weight, which can be similar to, or different from the weights assigned the nodes 202. Each edge, in addition to a weight, can have an associated type. The type can further define the relationship between the two nodes if the edge connects those nodes. For example, edge 204 can be of type "related", "example of", "results for", "corresponds to", or "indicative of", among others.

Figure 3:
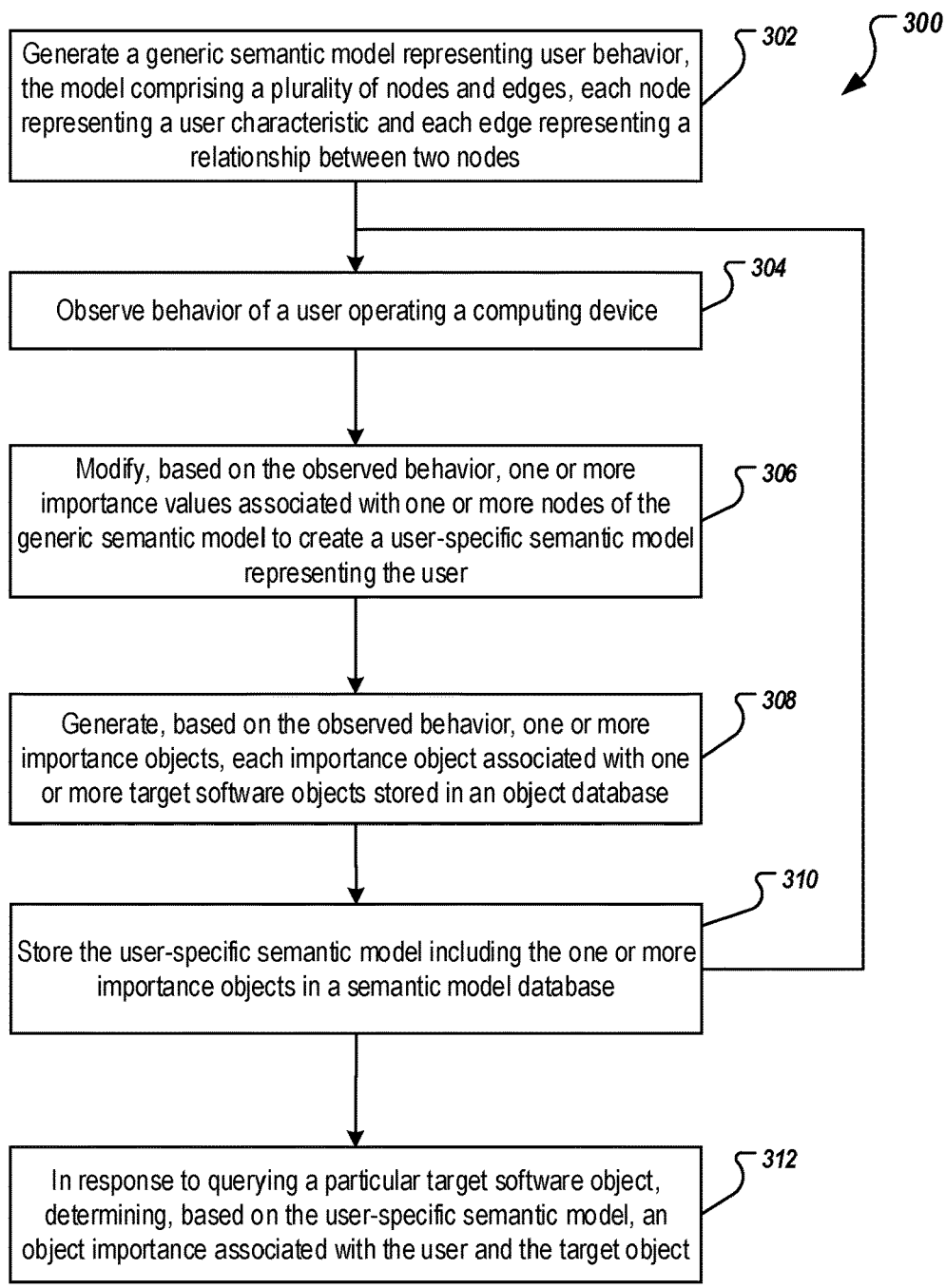
FIG. 3 is a flow diagram depicting an example method for generating a unified semantic model.

FIG. 3 is a flow diagram of an example method 300 for generating a unified semantic model of user intent. However, it will be understood that method 300 may be performed, for example, by any other suitable system, environment, software, and hardware, or a combination of systems, environments, software, and hardware as appropriate. In some instances, method 300 can be performed by the system 100, or portions thereof, described in FIG. 1, as well as other components or functionality described in other portions of this description. In other instances, method 300 may be performed by a plurality of connected components or systems. Any suitable system(s), architecture(s), or application (s) can be used to perform the illustrated operations.

In one instance, method 300 describes a method performed within a system of an enterprise computing environment comprising a communications module, at least one memory, and at least one hardware processor interoperably coupled with the at least one memory and the communications module.

At 302, a generic semantic model is generated, the model representing expected user behavior and including multiple nodes and edges, each node representing a user characteristic, and each edge representing a relationship between two nodes. The generic semantic model to be generated can be selected based on a user role, or specified by the user. In some implementations, the generic semantic model provides a starting point in modeling the user's behavior, and will be modified as described in the present disclosure. In some implementations, the generic model can be created in parallel with a new software package or update. For example, as developers are developing code for an application, other developers can create a generic semantic model by creating what they believe will be the nodes, edges and associated weights associated with that new software package or update. That base, generic model can be released with the new software package or update. In another implementation, the generic model can be created from an amalgamation of a group of user-specific models. In such cases, after a period of time (e.g., one month or more), a group of user-specific models can be combined or aggregated in such a way that the nodes and weights associated with the edges represent a typical user generated from the group and that average is then used as the base, generic model going forward.

At 304, user behavior while operating a computing device is observed. The observations can be performed by the computing device itself (e.g., client device 146 of FIG. 1), additional external devices (e.g., auxiliary devices 160 of FIG. 1), or any suitable combination thereof. Observations can include observed aspects of the user's behavior or reactions, as well as environmental or ambient aspects surrounding the user. Observations can include, but are not limited to, keystrokes, mouse clicks, mouse position, screen touches, facial expressions, user movement, user gestures, user vocalizations, heart rate of the user, neuro-activity of the user (e.g., via a brain computer interface), ambient light, ambient sound, ambient temperature, applications displayed on the screen of a computing device, applications executing on the computing device, applications executing on one or more auxiliary devices (e.g., auxiliary devices 160 of FIG. 1), gaze location (e.g., via eye tracking hardware and software), and/or other observed behavior.

At 306, one or more importance values associated with one or more nodes of the generic semantic model are modified to create a user-specific semantic model representing the user. For example, if the observations show that the user is highly stressed and that their typing rate has increased, an importance value associated with the stress node, with the type rate node, and the edge connecting them can be modified, indicating a new or updated relationship between typing rate and stress of the user. In some implementations, where a user-specific model has already been developed and is being updated based on further observed behavior, the user-specific model is updated. In other words, method 300 can be an iterative processes, in which a user-specific semantic model is generated and incrementally improved as more observed behavior is collected.

At 308, one or more importance objects associated with one or more target software objects stored in an object database are generated. The importance objects can be software objects that are stored in the user-specific semantic model, and which indicate a relative importance or relevance to the user for their associated target object in the object database. For example, if a user is a code developer who works on scripts for a backend system, then color and GUI objects in the object database may have importance objects that have a low value in the code developer's user-specific semantic model. In contrast, a GUI developer who works on the front-end of the same system may have a user-specific semantic model with importance objects for color and GUI objects that have a high value when compared to the code developer.

At 310, the user-specific semantic model, including the one or more importance objects are stored in a semantic model database. The semantic model database can be separate from the object database with which the user is interacting, or it can be the same. For example, the user-specific semantic models can be stored with the target objects for which it determines an importance or relevance for user, or it can be a separate database. In some implementations, the semantic model database provides for querying and searching, so that a developer can rapidly assess the intent or importance of groups of users or specific users, with respect to specific objects in the objects database. Further, additional observations can continue, and the process can repeat (e.g., return to 304). In this manner the user-specific semantic model can be updated continuously or periodically.

At 312, in response to a particular target software object being queried, an object importance associated with the user and the particular target object is determined based on the user-specific semantic model associated with the user. In some implementations, the user-specific semantic model can be compared with other semantic models associated with other users, and insights can be generated regarding how groups of users or different users may associate importance with different objects. For example, consider a situation where user Alice has a model very close in weights and observations as to user Bob. Bob has been observed as finding a set of objects Alice has never seen before as very important. However, Alice's model doesn't have any data for those objects. In such an instance, Alice's model could be extended to Bob's to allow predictions on how Alice would react to those objects, as she has been determined to be close to Bob. In some implementations, users can receive a summary analysis of their user-specific semantic model, providing them feedback on what is considered most important to them and how their use of the system is influenced.

The preceding figures and accompanying description illustrate example processes and computer-implementable techniques. However, system 100 (or its software or other components) contemplates using, implementing, or executing any suitable technique for performing these and other tasks. It will be understood that these processes are for illustration purposes only and that the described or similar techniques may be performed at any appropriate time, including concurrently, individually, or in combination. In addition, many of the operations in these processes may take place simultaneously, concurrently, and/or in different orders than as shown. Moreover, the described systems and flows may use processes and/or components with or performing additional operations, fewer operations, and/or different operations, so long as the methods and systems remain appropriate.

In other words, although this disclosure has been described in terms of certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure.

The invention claimed is:

1. A computer-implemented method for improving user experience comprising:
    generating a generic semantic model representing user behavior, the generic model comprising a plurality of nodes and edges, wherein each node represents a user characteristic and has an associated importance value, and wherein each edge defines a relationship between two nodes;
    observing an application executing on a computing device being used by a user;
    modifying, based on the observed application executing for the user on the computing device, one or more importance values associated with one or more nodes of the generic semantic model to create a user-specific semantic model representing the user;
    generating, based on the observed application executing for the user on the computing device, one or more importance objects, wherein the one or more importance objects are each associated with one or more target software objects stored in an object database;
    storing the user-specific semantic model and the one or more associated importance objects in a semantic model database; and
    in response to receiving a query of a particular target software object, determining, based on the user-specific semantic model and the one or more associated importance objects, a relevance of the target object to the user.

2. The computer-implemented method of claim 1 wherein observing the application executing for the user on the computing device comprises recording one or more observed parameters associated with the user's operation of the computing device.

3. The computer-implemented method of claim 2, wherein the observed parameters include user behavioral responses identified while operating the computer device comprising at least one of:
    user heartrate;
    user gaze location;
    neuro-activity received from a brain computer interface; or
    user body position and movement.

4. The computer-implemented method of claim 3, comprising:
    determining a user emotional state based on the observed parameters, the user emotional state comprising:
    a stress rating;
    an attention rating; and
    a happiness rating.

5. The computer-implemented method of claim 2, wherein the observed parameters include environmental parameters associated with a location of the computer device comprising at least one of:
    ambient noise;
    ambient light;
    physical location; or
    connection type.

6. The computer-implemented method of claim 1, wherein the one or more target software object comprises a hierarchy of target objects, and wherein the importance object associated with a parent target software object is associated with one or more child target software objects.

7. The computer-implemented method of claim 1, wherein the generic semantic model is generated based on an identified role of the user.

8. The computer-implemented method of claim 1, wherein modifying the one or more importance values comprises inputting information associated with the observed application executing for the user to a machine learning model, and wherein the machine learning model determines one or more modified importance values.

9. A non-transitory computer-readable storage medium coupled to one or more processors and having instructions stored thereon which, when executed by the one or more processors, cause the one or more processors to perform operations for improving a user experience, the operations comprising:
    generating a generic semantic model representing user behavior, the generic model comprising a plurality of nodes and edges, wherein each node represents a user characteristic and has an associated importance value, and wherein each edge defines a relationship between two nodes;
    observing an application executing on a computing device being used by a user;
    modifying, based on the observed application executing for the user on the computing device, one or more importance values associated with one or more nodes of the generic semantic model to create a user-specific semantic model representing the user;
    generating, based on the observed application executing for the user on the computing device, one or more importance objects, wherein the one or more importance objects are each associated with one or more target software objects stored in an object database;

storing the user-specific semantic model and the one or more associated importance objects in a semantic model database; and in response to receiving a query of a particular target software object, determining, based on the user-specific semantic model and the one or more associated importance objects, a relevance of the target object to the user.

10. The computer-readable medium of claim 9 wherein observing the application executing for the user on the computing device comprises recording one or more observed parameters associated with the user's operation of the computing device.

11. The computer-readable medium of claim 10, wherein the observed parameters include user behavioral responses identified while operating the computer device comprising at least one of:
   user heartrate;
   user gaze location;
   neuro-activity received from a brain computer interface; or
   user body position and movement.

12. The computer-readable medium of claim 11, comprising:
   determining a user emotional state based on the observed parameters, the user emotional state comprising:
   a stress rating;
   an attention rating; and
   a happiness rating.

13. The computer-readable medium of claim 10, wherein the observed parameters include environmental parameters associated with a location of the computer device comprising at least one of:
   ambient noise;
   ambient light;
   physical location; or
   connection type.

14. The computer-readable medium of claim 10, wherein the one or more target software object comprises a hierarchy of target objects, and wherein the importance object associated with a parent target software object is associated with one or more child target software objects.

15. The computer-readable medium of claim 10, wherein the generic semantic model is generated based on an identified role of the user.

16. The computer-readable medium of claim 10, wherein modifying the one or more importance values comprises inputting information associated with the software executing for the user to a machine learning model, and wherein the machine learning model determines one or more modified importance values.

17. A system, comprising:
   one or more computers; and
   a computer-readable storage device coupled to the one or more computers and having instructions stored thereon which, when executed by the one or more computer, cause the one or more computers to perform operations for improving a user experience, the operations comprising:
   generating a generic semantic model representing user behavior, the generic model comprising a plurality of nodes and edges, wherein each node represents a user characteristic and has an associated importance value, and wherein each edge defines a relationship between two nodes;
   observing an application executing on a computing device being used by a user;
   modifying, based on the observed application executing for the user on the computing device, one or more importance values associated with one or more nodes of the generic semantic model to create a user-specific semantic model representing the user;
   generating, based on the observed application executing for the user on the computing device, one or more importance objects, wherein the one or more importance objects are each associated with one or more target software objects stored in an object database;
   storing the user-specific semantic model and the one or more associated importance objects in a semantic model database; and
   in response to receiving a query of a particular target software object, determining, based on the user-specific semantic model and the one or more associated importance objects, a relevance of the target object to the user.

18. The system of claim 17 wherein observing the application executing for the user on the computing device comprises recording one or more observed parameters associated with the user's operation of the computing device.

19. The system of claim 18, wherein the observed parameters include user behavioral responses identified while operating the computer device comprising at least one of:
   user heartrate;
   user gaze location;
   neuro-activity received from a brain computer interface; or
   user body position and movement.

20. The system of claim 19, comprising:
   determining a user emotional state based on the observed parameters, the user emotional state comprising:
   a stress rating;
   an attention rating; and
   a happiness rating.

* * * * *